(12) United States Patent
Noé

(10) Patent No.: US 7,292,646 B2
(45) Date of Patent: Nov. 6, 2007

(54) APPARATUS AND METHOD FOR SYNCHRONOUS DEMODULATION

(76) Inventor: Reinhold Noé, Helmerner Weg 2, Paderborn (DE) D-33100

( * ) Notice: Subject to any disclaimer, the term of this patent is extended or adjusted under 35 U.S.C. 154(b) by 676 days.

(21) Appl. No.: 10/898,380

(22) Filed: Jul. 23, 2004

(65) Prior Publication Data
US 2005/0031052 A1    Feb. 10, 2005

(30) Foreign Application Priority Data
Jul. 26, 2003    (DE) ................ 103 34 154

(51) Int. Cl.
*H04L 27/10*    (2006.01)
*H03D 3/22*    (2006.01)
(52) U.S. Cl. ...................... 375/279; 375/329
(58) Field of Classification Search ................ 375/279, 375/329, 332, 379, 308; 329/304, 325
See application file for complete search history.

(56) References Cited

U.S. PATENT DOCUMENTS

| 3,654,564 A | | 4/1972 | Tisi et al. | |
|---|---|---|---|---|
| 6,603,349 B2 | * | 8/2003 | Carrozza et al. | 329/304 |
| 7,180,960 B2 | * | 2/2007 | Sachse et al. | 375/308 |

FOREIGN PATENT DOCUMENTS

| DE | 1 814 478 | 6/1970 |
|---|---|---|
| DE | 2 025 269 | 11/1970 |
| DE | 37 22 936 A1 | 1/1989 |
| DE | 37 24 536 A1 | 2/1989 |
| DE | 39 35 911 A1 | 5/1991 |
| DE | 41 10 138 C1 | 3/1992 |

OTHER PUBLICATIONS

Frowin Derr: "Coherent Optical QPSK Intradyne System: Concept and Digital Receiver Realization", *Journal of Lightwave Technology*, vol. 10, No. 9, Sep. 1992, pp. 1290-1296.

* cited by examiner

*Primary Examiner*—Khai Tran
(74) *Attorney, Agent, or Firm*—Laurence A. Greenberg; Werner H. Stemer; Ralph E. Locher

(57) ABSTRACT

In the apparatus and the associated method, N-ary phase shift keyed received signals R12 are temporally demultiplexed in a 1:M demultiplexer DEMUX. In each of the sub-units DU1 . . . DUM the carrier signal C12 of the received signal R12 is recovered. The carrier phase angle angC12 is always chosen in the range $-\pi/N$ . . . $\pi/N$. Occurring phase jumps PHJ of the carrier phase angle angC12 from one sub-unit DU(i−1) to the next, DUi, of size $\pm 2\pi/N$ are detected and are taken into account in a differential decoding of the synchronously demoudlated received signals R12. For this purpose, signals of the same or other sub-units must be temporarily stored in the sub-unit DUi until they are needed. In this way one obtains a high tolerance with respect to phase noise of the received signal R12.

10 Claims, 2 Drawing Sheets

US 7,292,646 B2

APPARATUS AND METHOD FOR SYNCHRONOUS DEMODULATION

BACKGROUND OF THE INVENTION

Field of the Invention

The invention relates to an apparatus and an associated method for a synchronous demodulation of phase shift keyed signals.

A receiver with synchronous demodulation has been described in Frowin Derr, Coherent optical QPSK intradyne system: Concept und digital receiver realization, *IEEE J. Lightwave Technology* Vol. 10, 1290-1296, (1992). The carrier phase is ambiguous according to the number of transmitted phase values, twofold in the case of binary phase shift keying, abbreviated BPSK, and fourfold in the case of quaternary or quadrature phase shift keying, abbreviated QPSK. For a realization at the lowest possible cost of such and similar receivers it is desirable to sample the available electrical signals at the symbol clock frequency or a multiple thereof. Especially in such digital receivers it is difficult to avoid ambiguity errors of the recovered carrier phase. After sampling at the symbol rate the sampled values can be demultiplexed, i.e. distributed into M data streams, the symbol rate of each of which is 1/M times as large as the original symbol rate. However, if all signal processing operations are performed at the 1/M-fold of the original symbol rate then the problem occurs that the phases of the recovered carrier occuring in the various demultiplex channels can carry ambiguity errors. For BPSK an error of the size $\pi$ can occur. For QPSK errors of the size $\pi/2$, $\pi$ or $3\pi/2$ can occur. This causes errors during data recovery. At best, narrow linewidths of the employed lasers can avoid this, but lasers with narrow linewidths require external resonators, which is inconvenient and leads to high cost.

SUMMARY OF THE INVENTION

It is therefore an object of the invention to specify an apparatus and an associated method for a synchronous demodulation of phase shift keyed signals which is immune against ambiguity errors of the phase of the recovered carrier.

With the above and other objects in view there is provided, in accordance with the invention, an apparatus for a synchronous demodulation of a received signal that is phase shift keyed in N steps, where N is a phase step number, with the aid of at least one received signal parameter derived from the received signal and at least one carrier signal parameter corresponding to a recovered carrier, comprising:

a demodulator for generating at least one third data signal parameter from at least one received signal parameter and at least one carrier signal parameter by way of synchronous demodulation and digitization, the third data signal parameter corresponding to a third data signal;

a phase angle comparator connected to said demodulator, said phase angle comparator detecting phase jumps of the recovered carrier signal in quantized form from at least one carrier signal parameter; and a coding unit connected to said demodulator and to said phase angle comparator, said coding unit taking into account in quantized form the phase jumps in a differential decoding of the third data signal parameter.

In accordance with an added feature of the invention, there is provided the apparatus wherein:

said phase angle comparator is configured to generate a fifth phase number as an integer number, the fifth phase number corresponding to a phase jump of the recovered carrier signal, the phase jump being equal to the value of the fifth phase number times $2\pi/N$;

a third phase number representing the third data signal parameter; and said coding unit is configured to generate a fourth phase number from a current third phase number, from the third phase number delayed by K symbol durations, wherein K is a delay index, and from the fifth phase numbers delayed by 0 to (K−1) symbol durations.

In accordance with a further feature of the invention, the apparatus further comprises a transmitter side, and a first coding unit at the transmitter side, said first coding unit generating a second phase number which corresponds to a second data signal by modulo-N addition of a first phase number which corresponds to a first data signal intended for transmission and the negative of said second phase number delayed by K symbol durations; and said received signal which in complex notation is formed proportional to a received complex carrier times said second data signal, so that said fourth phase number corresponds to said first phase number delayed by the delay that occurs during transmission.

In accordance with again an added feature of the invention, the apparatus further comprises:

a 1:M demultiplexer for receiving at least one received signal parameter and having M outputs; and first to M-th sub-units, each connected to a respective one of the M outputs of said 1:M demultiplexer, said sub-units providing at least one fourth signal parameter in demultiplexed form.

In accordance with again an additional feature of the invention, the apparatus further comprises:

at least one storage unit in an i-th of said sub-units, said storage unit storing at least one signal that is generated by at least one of said 1:M demultiplexers and i-th and other of said sub-units until the signal is needed for further processing.

With the above and other objects in view there is also provided, in accordance with the invention, a method for a synchronous demodulation of a received signal that is phase shift keyed in N steps, where N is a phase step number, with the aid of at least one received signal parameter derived from the received signal and at least one carrier signal parameter corresponding to a recovered carrier, the method which comprises:

generating at least one third data signal parameter from at least one received signal parameter and at least one carrier signal parameter by synchronous demodulation and digitization, the third data signal parameter corresponding to a third data signal;

detecting phase jumps of the recovered carrier signal in quantized form from at least one carrier signal parameter; and taking into account in quantized form the phase jumps in a differential decoding of the third data signal parameter.

In accordance with again an added feature of the invention, the method comprises:

generating a fifth phase number formed as an integer, the fifth phase number corresponding to a phase jump of the recovered carrier signal, the phase jump being equal to a value of the fifth phase number times $2\pi/N$;

forming the third data signal parameter as a third phase number; and generating a fourth phase number from a current third phase number, from the third phase number delayed by K symbol durations, wherein K is a delay index, and from the fifth phase numbers delayed by 0 to (K−1) symbol durations.

In accordance with again an additional feature of the invention, the method comprises:

generating a second phase number corresponding to a second data signal by modulo-N addition of a first phase number corresponding to a first data signal intended for transmission and a negative of the second phase number delayed by K symbol durations; and forming the received signal in complex notation to be proportional to a received complex carrier times the second data signal, so that the fourth phase number corresponds to the first phase number delayed by a delay occurring during transmission.

In accordance with again another feature of the invention, the method comprises:

temporally demultiplexing at least one received signal parameter with a 1:M demultiplexer to form a demultiplexed received signal parameter; and generating at least one fourth signal parameter in demultiplexed form from the demultiplexed received signal parameter.

In accordance with again an additional feature of the invention, the method comprises:

subsequent to a completion of the demultiplexing step, storing at least one signal until the signal is needed for further processing.

Other features which are considered as characteristic for the invention are set forth in the appended claims.

Although the invention is illustrated and described herein as embodied in an apparatus and method for a carrier recovery, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Other features which are considered as characteristic for the invention are set forth in the appended claims.

Although the invention is illustrated and described herein as embodied in an apparatus and method for a synchronous demodulation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
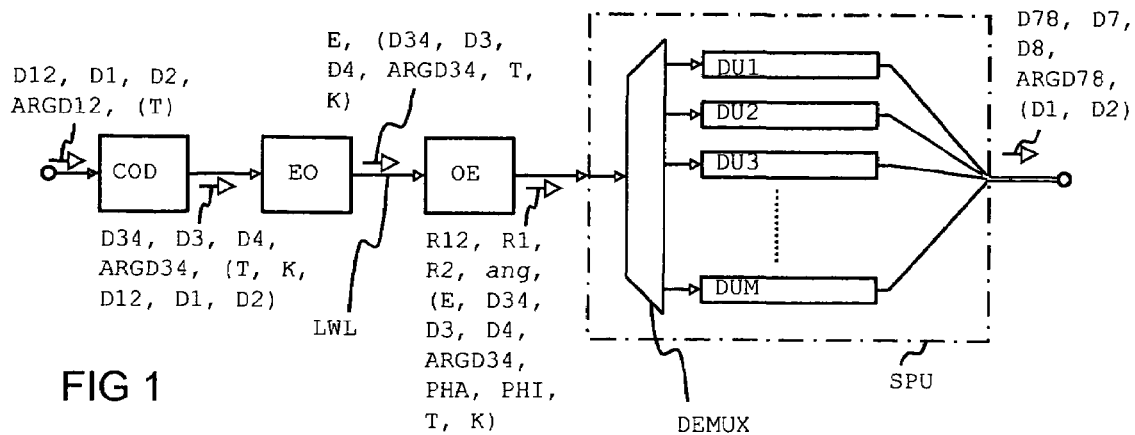
FIG. 1 is a system for optical information transmission with phase shift keying.

In FIG. 1 a system for optical information transmission with phase shift keying is shown. For a more compact description complex signals are used in the following. Proportionality factors of various signals are neglected for simplicity. The variable names, equations and expressions that are dispersed in the following description have been written in the programming language MATLAB and are subsequently employed in a program which illustrates the inventive method. andandThe variable indexes of the MATLAB program in parentheses behind the variable names, which indicate the course of time with a temporal quantization equal to one symbol duration T, are usually left out in the description for simplicity.

A first data signal D12 is to be transmitted, and it assumes various states in the course of time. We first assume quaternary or quadrature phase shift keying, corresponding to a phase step number N with the value N=4. There is N-ary phase shift keying. In this case the first data signal D12 equals D12=D1+j*D2, where D1, D2 are a first and a second binary signal, respectively, and and j is the imaginary unit. The binary signals are chosen as bipolar, i.e. they may assume the values 1 and −1.

For transmission of first and second binary signals D1, D2 the angle quadrant, which contains the complex first data signal D12=D1+j*D2, is given by a first phase number ARGD12 between 0 and (N−1). The transformation rule, which holds also for further variables that will be introduced later, is given in Table 1. It corresponds to a Gray encoding. If the first phase number ARGD12 is falsified modulo N by 1 or −1 during transmission only one of the first and second binary signals D1, D2 will be falsified.

TABLE 1

| D1, D3, D5, D7 | D2, D4, D6, D8 | ARGD12, ARGD34, ARGD56, ARGD78 |
|---|---|---|
| 1 | 1 | 0 |
| −1 | 1 | 1 |
| −1 | −1 | 2 |
| 1 | −1 | 3 |

Whether a data signal, the real part of which is one and the imaginary part of which is another binary signal, is expressed by a complex variable or by these binary signals or by the corresponding phase number is of no concern. Likewise, an arbitrary complex signal can be represented at will by magnitude and phase, by real and imaginary parts, or as a multiphase signal by the real parts of various products of the complex signal and different phasors, for example 1, $\exp(j*2\pi/3)$, $\exp(j*4\pi/3)$, because all these representations can uniquely be transformed into each other. When building an apparatus for the conduction of the method one can always choosen the most advantageous representation. Likewise, it is in principle not of importance whether a signal exists in analog or digitized form. For simplicity the following description assumes that signals are existent in the form of equidistant samples, the temporal separations of which is always a symbol duration T. In addition, at least some of these can also exist in a temporally demultiplexed form, so that they can be processed more easily.

In order to allow for a later differential decoding in the receiver, a second phase number ARGD34 is generated at the transmitter side. This takes place in transmitter sided first coding unit COD by means of a modulo-N addition of the first phase number ARGD12 and the second phase number ARGD34, which latter is delayed by a delay index K that indicates a delay of K symbol durations T. The delay index K must be a positive integer. The value K=1 is often advantageous, but other values are likewise possible. Values of the delay index K which are integer powers of 2, i.e, K=2, 4, 8, 16, allow it to calculate the second phase number ARGD34 in the second-, third, fourth- or fifth-highest time division multiplex layer, which can be advantageous, the highest being the time division multplex layer corresponding to the symbol frequency 1/T. The second phase number ARGD34 corresponds to a complex second data signal D34=D3+j*D4, where the relation between the second phase number ARGD34 and the third and fourth binary symbols D3, D4 is likewise given by Table 1.

The second data signal D34, which contains the information of the first data signal D12 in coded form, is being transmitted as a message, for example like this: The optical field E of an optical signal is made proportional to the second data signal D34 by a modulation in an electrooptic converter EO which contains a laser and a modulator of the optical field E, and is transmitted through an optical fiber LWL. At the receive end the optical field E is converted and mixed into an electrically processable frequency range by means of a local oscillator and a mixer. For the optical signal transmission this can be a coherent optical receiver OE that is equipped with a local laser and delivers a received signal R12, which is proportional to D34*PHA. It can be formed so that the received signal R12=R1+j*R2 is available in form of its real part R1, which is a received signal real part R1, and its imaginary part R2, which is a received signal imaginary part R2. PHA=exp(j*PHI) is a complex phasor PHA, which corresponds to a phase angle difference PHI between transmitter and local oscillator. In the following the information of first and second binary signals D1, D2 shall be recovered from the received signal R12. This is accomplished in a Dies erfolgt in a signal processing unit SPU, which delivers at its output seventh and eighth binary signals D7, D8 which, except for quite rare transmission errors, are identical to the delayed first and second binary signals D1, D2.

Initially, a frequency-multiplied signal FM12=FM1+j*FM2, which is again be represented as a complex signal with the real part FM1 and the imaginary part FM2 and which is frequency-multiplied by the factor N with respect to the received signal R12. It is chosen proportional to the N-th power of the complex received signal R12. For N=4 a negative proportionality factor is chosen because the complex number (±1±j) taken to the fourth power equals −4.

In a first embodiment, choosable by method=1 in the below-given program, the complex received signal R12=R1+j*R2 is first squared, in which operation a frequency-doubled signal with real part R3=R1*R1−R2*R2 and imaginary part R4=2*R1*R2 is generated. For N=4 the frequency-doubled signal is squared once more and its sign, corresponding to the negative proportionality factor, is changed, in which operation real part FM1 and imaginary part FM2 of the frequency-multiplied signal FM12 are formed according to the rules FM1=−R3*R3+R4*R4, FM2=−2*R3*R4.

The frequency-multiplied signal FM12 is subsequently lowpass-filtered, in which operation a lowpass-filtered signal L12 is generated. Real part L1 and imaginary part L2 of the lowpass-filtered signal L12=L1+j*L2 are obtained by lowpass-filtering of real part FM1 and imaginary part FM2 of the frequency-multiplied signal FM12, respectively, for example by taking the mean of the last NN available samples delFM1(1:NN) and delFM2(1:NN) of real part FM1 and imaginary part FM2 of the frequency-multiplied signal FM12, respectively.

Figure 2:
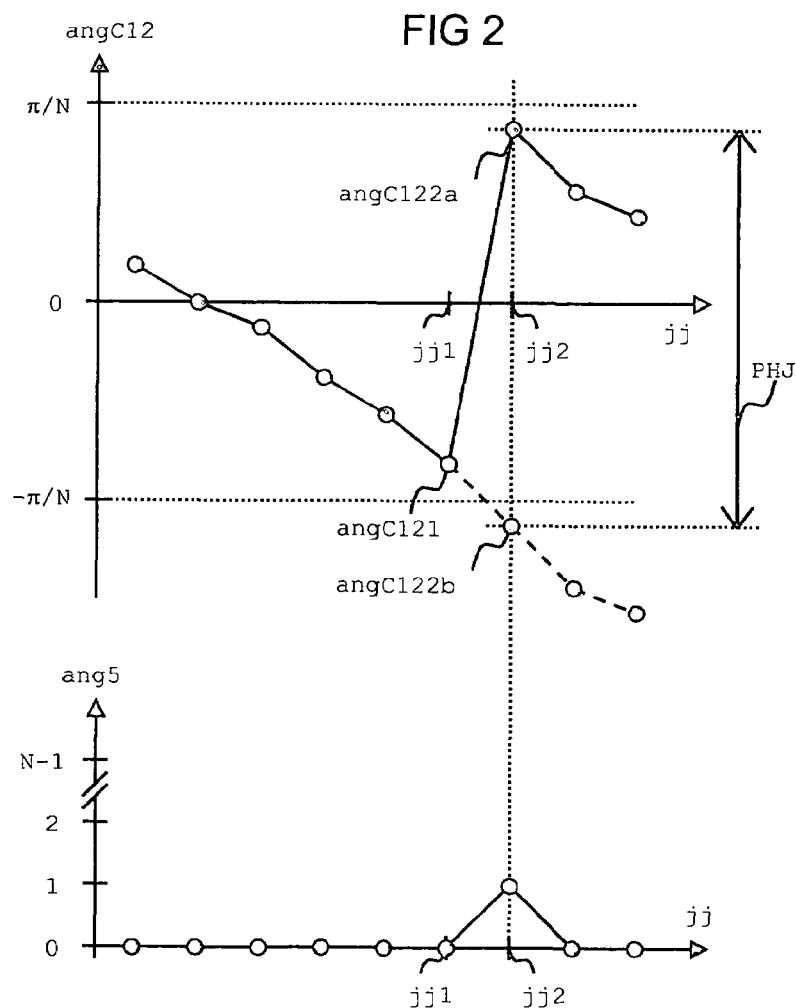
FIG. 2 is a diagram of temporal courses of a carrier phase angle and a fifth phase number.

The carrier C12 is subsequently recovered. This can be accomplished by taking the N-th root of the lowpass-filtered signal L12. This procedure is N-fold ambiguous. The phase angle of the carrier C12, called carrier phase angle angCl2, is for example always chosen between −π/N and π/N, i.e. with as small as possible an absolute value. In the upper half of FIG. 2 an exemplary behavior of the carrier phase angle angC12 is depicted by the solid line as a function of a temporal index jj of the MATLAB program, which means the progressing time with a temporal quantization unit equal to a symbol duration T.

Now the received signal R12 is synchronously demodulated. In this process an analog demodulation signal S12 is generated. In order to keep the vulnerability by phase noise minimal the received signal R12 is delayed before its demodulation by the same amount as the carrier signal C12 was delayed in the course of its generation from the received signal R12. In the current example the necessary delay equals (NN−1)/2 samples.

If received signal R12 and carrier signal C12 are available in form of the respective real parts and imaginary parts, i.e. R12=R1+j*R2 and C12=C1+j*C2, then the demodulation signal S12 is obtained by multiplication of the received signals R12 that is delayed as described above with the complex conjugate carrier signal C12. This multiplication can for example be carried out separately for real part S1 and imaginary part S2 of the demodulation signal S12=S1+j*S2. It holds S1=delR1(NNN)*C1+delR2(NNN)*C2, S2=−delR1(NNN)*C2+delR2(NNN)*C1, where delR1(NNN), delR2(NNN) is the received signal real part R1 bzw. received signal imaginary part R2, respectively, delayed by (NN−1)/2 samples each. The carrier C12 can be obtained iteratively from the lowpass-filtered signal L12. Alternatively one can obtain the carrier phase angle angCl2 according to the rule angC12=(1/N)*angle(L12), for example by reading the appropriate value from a look-up table. In doing so, the carrier phase angle angC12 which lies in the interval −π/N ... π/N is obtained from the phase angle angle(L12) of the lowpass-filtered signals L12, which itself may be arbitrary values. Real part C1 and imaginary part C2 of the carrier C12 are obtained by the rule C1=cos(angC12) and C2=sin(angC12), respectively.

Subsequently, the demodulation signal S12 is binarily digitized, separately for real part and imaginary part, in which process a third data signal D56=D5+j*D6 is generated, with a fifth binary signal D5 as real part and a sixth binary signal D6 as imaginary part. Fifth and sixth binary signal D5, D6 equals 1, if real part S1 and imaginary part S2, respectively, of the demodulation signals S12 is larger than zero, else it equals −1. From the fifth and sixth binary signal D5, D6 a third phase number ARGD56 is obtained according to Table 1. Due to the transmitter-sided differential encoding now a differential decoding has to be carried out, in which process a sixth phase number ARG6 is obtained. For this purpose the third phase number ARGD56, ARGD56(jj−K) delayed by K symbol durations T is subtracted from the third phase number ARGD56 modulo N, with a sixth phase number ARG6, ARG6(jj) as a result, where K is the above-introduced delay index K. Third phase number ARGD56, third data signal D56, fifth binary signal D5 and sixth binary signal D6 each can be considered as a third data signal parameter ARGD56, D56, D5, D6.

The sixth phase number ARG6 is not always identical with the first phase number ARGD12. This is due to ambiguities of the recovered carrier C12. E.g., the carrier phase angle angC12 may have a temporal behavior as sketched in the upper half of FIG. 2 by a solid line. However, from the value jj1 of the temporal index jj to the subsequent value jj2 of the temporal index jj a jump of the carrier phase angles angC12 occurs with an absolute value larger than $\pi$/N. Accordingly the fifth phase number ARG5 is being assigned a value unequal zero, here the value 1, at the value jj2 of the temporal index jj. This is because for a minimization of the bit error ratio it has to be assumed that a continuation of the functional course of the carrier phase angles angC12 from the value angC121 to the nearby value angC122b and then further along the dashed line is correct, while the truly occuring value angC122a and the subsequent functional course are much less probable. According to this the carrier signal C12 exhibits with respect to its phase value, i.e. the carrier phase angle angC12, a phase jump PHJ which here differs from 0 and here has the size $2\pi$/N.

According to the invention arising phase jumps PHJ of the recovered carrier signal C12, by which terminology jumps of the carrier phase angles angC12 quantized according to integer multiples of $2\pi$/N are meant, are detected and are taken into account in a differential decoding of the demodulated phase-shift keyed signals. This is carried out as follows: If for a phase step number N=4 the difference angC12–angC12old between current carrier phase angle angC12 and a carrier phase angle angC12old that lies back by one symbol duration T lies in the interval [$-\pi/4$, $\pi/4$[, [$\pi/4$, $3\pi/4$[, [$3\pi/4$, $5\pi/4$[ or [$5\pi/4$, $7\pi/4$[, then the fifth phase number ARG5 is being assigned the value 0, 1, 2 or 3, corresponding to a phase jump PHJ of the size 0, $\pi/2$, $\pi$ or $3\pi/2$, respectively.

According to the principle of the invention, all those fifth phase numbers ARG5(jj:$-1$:jj$-$(K$-$1)), which lie back by not more than (K$-$1) symbols, i.e. a total of K such fifth phase numbers ARG5, and the sixth phase number ARG6 are according to the principle of the invention added modulo N, with the result of a fourth phase number ARGD78. This is re-coded according to Table 1 into seventh and eighth binary symbols D7, D8. The reasond for the addition of all these fifth phase numbers ARG5(jj:$-1$:jj$-$(K$-$1)) is that their sum can be regarded as another phase number which corresponds to the sum of all phase jumps PHJ that lie back no more than (K$-$1) symbols. For K=1 only a single fifth phase number ARG5 must be added which is available at the same time as the sixth phase number ARG6. This simplifies the implementation of the method.

The use of the sixth phase number ARG6 is not mandatory. Rather the modulo-N addition of the third phase number ARGD56(jj), of the negative of the third phase number ARGD56(jj$-$K) delayed by K symbol durations T, and of all those fifth phase numbers ARG5(jj:$-1$:jj$-$(K$-$1)) which lie back not more than (K$-$1) symbols to the fourth phase number ARG78(jj) as result can be conducted in one step or in arbitrary sequence. Seventh and eighth binary symbols D7, D8 correspond, neglecting a delay of (NN$-$1)/2 symbol durations T in this example and possibly arising bit errors during transmission, exactly to the first and second binary symbols D1, D2.

Here is a program, written in the programming language MATLAB, which illustrates the method:

```
% initializations
clear; format compact; format short e; rand('state',0);
N=4; K=1; method=1;
D1(1:K)=1; D2(1:K)=1; ARGD12(1:K)=0; ARGD34(1:K)=0;
D3(1:K)=1; D4(1:K)=1; D34(1:K)=D3(1:K)+j*D4(1:K);
R12(1:K)=D34(1:K); PHA=1; dPHA(1:K)=1;
NN=9; NNN=(NN+1)/2;
if (N==4),
    delFM1=4*ones(1,NN); ang=pi/4*ones(1,NNN);
else
    delFM1=ones(1,NN); ang=zeros(1,NNN);
end
delFM2=zeros(1,NN);
angC12=0;
delR1=ones(1,NNN); delR2=ones(1,NNN);
C1=1; C2=0;
jk=30;
dPHIoffset=0.1;
% due to an IF value which accidentally differs from zero
sigmadPHI=0.01; % laser phase noise
jj=K;
while (jj<jk+NNN+K-1),
    jj=jj+1;
    % bipolar data symbol
    D1(jj)=2*round(rand(1,1))-1;
    if (N==4)
        D2(jj)=2*round(rand(1,1))-1;
        % digitized angle thereof
        if ((D1(jj)== 1)&(D2(jj)== 1)) ARGD12(jj)=0; end;
        if ((D1(jj)==-1)&(D2(jj)== 1)) ARGD12(jj)=1; end;
        if ((D1(jj)==-1)&(D2(jj)==-1)) ARGD12(jj)=2; end;
        if ((D1(jj)== 1)&(D2(jj)==-1)) ARGD12(jj)=3; end;
    else,
        % digitized angle thereof
        if (D1(jj)== 1) ARGD12(jj)=0; else ARGD12(jj)=1; end;
    end;
    % differential digitized angle encoding
    ARGD34(jj)=mod(ARGD12(jj)+ARGD34(jj-K),N);
```

```
% bipolar symbol to be transmitted
if (N==4)
    if (ARGD34(jj)==0) D3(jj)= 1; D4(jj)= 1; end;
    if (ARGD34(jj)==1) D3(jj)=-1; D4(jj)= 1; end;
    if (ARGD34(jj)==2) D3(jj)=-1; D4(jj)=-1; end;
    if (ARGD34(jj)==3) D3(jj)= 1; D4(jj)=-1; end;
    % complex symbol
    D34(jj)=D3(jj)+j*D4(jj);
else
    if (ARGD34(jj)==0) D3(jj)= 1; else D3(jj)=-1; end;
    % complex symbol
    D34(jj)=D3(jj);
end;
% incremental phase error
dPHI=real(exp(j*2*pi*rand(1,1))*sigmadPHI ...
          *sqrt(-2*log (rand(1,1))))+dPHIoffset;
% new phasor
PHA=PHA*exp(j*dPHI);
% received complex symbol
R12=D34(jj)*PHA; R1=real(R12); R2=imag(R12);
%%%%%%%%%%%%% The receiving process begins here. %%%%%%%%%%%%%
% recover carrier phase, projected into the range
% -pi/N ... pi/N (which is sometimes incorrect)
if (method==1),
    % feed received signal into delay line, which will be used later
    delR1(1:NNN)=[R1 delR1(1:(NNN-1))];
    delR2(1:NNN)=[R2 delR2(1:(NNN-1))];
    % frequency multiplication by a factor of 2
    R3=R1*R1-R2*R2; R4=2*R1*R2;
    if (N==4)
        % another frequency multiplication by a factor of 2,
        % und sign inversion
        FM1=-R3*R3+R4*R4; FM2=-2*R3*R4;
    else
        FM1=R3; FM2=R4;
    end;
    % the following line is not needed und is there
    % just for illustration
    FM12=FM1+j*FM2;
    % lowpass filtering
    delFM1(1:NN)=[FM1 delFM1(1:(NN-1))];
    delFM2(1:NN)=[FM2 delFM2(1:(NN-1))];
    L1=mean(delFM1); L2=mean(delFM2);
    L12=L1+j*L2;
    % obtain phase angle of carrier
    angC12=(1/N)*angle(L12);
    % obtain carrier und remember its previous value
    C1old=C1; C2old=C2;
    C1=cos(angC12); C2=sin(angC12);
    % Demodulate raw complex symbol.
    % Received signal is delayed by (NN+1)/2 symbols.
    S1= delR1(NNN)*C1+delR2(NNN)*C2;
    S2=-delR1(NNN)*C2+delR2(NNN)*C1;
    % demodulated raw digitized symbol
    D5(jj)=sign(S1); if (D5(jj)==0), D5(jj)=-1; end;
    if (N==4)
        D6(jj)=sign(S2); if (D6(jj)==0), D6(jj)=-1; end;
        % digitized angle thereof
        if ((D5(jj)== 1)&(D6(jj)== 1)) ARGD56(jj)=0; end;
        if ((D5(jj)==-1)&(D6(jj)== 1)) ARGD56(jj)=1; end;
        if ((D5(jj)==-1)&(D6(jj)==-1)) ARGD56(jj)=2; end;
        if ((D5(jj)== 1)&(D6(jj)==-1)) ARGD56(jj)=3; end;
    else
        % digitized angle thereof
        if (D5(jj)== 1) ARGD56(jj)=0; else ARGD56(jj)=1; end;
    end;
    % Important inventive step: determine differential carrier phase.
    % differential phasor
    dPHA1= C1*C1old+C2*C2old;
    if (N==4)
        dPHA2=-C1*C2old+C2*C1old;
        % digitized differential phasor, sorted into quadrants
        % dPHA=dPHA1+j*dPHA2;
        % For dPHA ~ 1, ARG5 = 0. This is the most frequent case.
        % For dPHA ~ -j, ARG5 = 3.
        % For dPHA ~ j, ARG5 = 1.
        % For dPHA ~ -1, ARG5 = 2. This occurs almost never.
        % Implementation:
        dph1=sign(dPHA1-dPHA2);
```

-continued

```
        dph2=sign(dPHA1+dPHA2);
        if ( (dph1==1)& (dph2==1)) ARG5(jj)=0; end;
        if (~(dph1==1)& (dph2==1)) ARG5(jj)=1; end;
        if (~(dph1==1)&~(dph2==1)) ARG5(jj)=2; end;
        if ( (dph1==1)&~(dph2==1)) ARG5(jj)=3; end;
    else
        % digitized differential phasor, sorted into half planes
        % For dPHA1 > 0, ARG5 = 0. This is the most frequent case.
        % For dPHA1 <= 0, ARG5 = 1.
        if (dPHA1>0) ARG5(jj)=0; else ARG5(jj)=1; end;
    end;
else,
    ang(2:NNN)=ang(1:(NNN-1));
    ang(1)=angle(R12); % Here the digitized symbols arrive.
    angFM12=N*ang(1); % frequency multiplication by a factor of N
    % obtain frequency-multiplied signal
    if (N==4)
        FM1=-cos(angFM12); FM2=-sin(angFM12);
    else
        FM1=cos(angFM12); FM2=sin(angFM12);
    end;
    % the following line is not needed und is there
    % just for illustration
    FM12=FM1+j*FM2;
    % lowpass filtering
    delFM1(1:NN)=[FM1 delFM1(1:(NN-1))];
    delFM2(1:NN)=[FM2 delFM2(1:(NN-1))];
    L1=mean(delFM1); L2=mean(delFM2); L12=L1+j*L2;
    % obtain phase angle of carrier und save its old value
    angC12old=angC12;
    angC12=(1/N)*angle(L12);
    % synchronous demodulation
    if (N==4)
        ARGD56(jj)=mod(floor((ang(NNN)-angC12)/(pi/2)+N),N);
    else
        ARGD56(jj)=abs(round((ang(NNN)-angC12)/pi));
    end;
        % Important inventive step: determine differential carrier phase.
        if jj>1,
            ARG5(jj)=mod(round((angC12-angC12old)/(2*pi/N)+N),N);
        else,
            ARG5(jj)=0;
        end;
    end;
    % differentially decoded angle, still subject to phase errors
    ARG6(jj)=mod((ARGD56(jj)-ARGD56(jj-K)+N),N);
    % Important inventive step: correct decoded digitized angle.
    ARGD78(jj)=mod(ARG6(jj)+sum(ARG5(jj:-1:(jj-(K-1)))),N);
    % correctly decoded bipolar data symbols
    if (N==4)
        if (ARGD78(jj)==0) D7(jj)= 1; D8(jj)= 1; end;
        if (ARGD78(jj)==1) D7(jj)=-1; D8(jj)= 1; end;
        if (ARGD78(jj)==2) D7(jj)=-1; D8(jj)=-1; end;
        if (ARGD78(jj)==3) D7(jj)= 1; D8(jj)=-1; end;
    else
        if (ARGD78(jj)==0) D7(jj)= 1; else D7(jj)=-1; end;
    end;
    %%%%%%%%%%% The receiving process ends here. %%%%%%%%%%%%
end;
nor=K+1:jk+K-1;          % normal symbol index
del=NNN+K:jk+NNN+K-2;    % delayed symbol index (delayed by NNN-1=(NN-1)/2)
if (N==4)
    if (jk<=100),
        [ARGD12(nor)' ARGD34(nor)' ARGD56(del)' ARG6(del)' ...
        ARG5(del)' ARGD78(del)' ARGD12(nor)'-ARGD78(del)' ...
        D1(nor)' D2(nor)' D7(del)' D8(del)']
    end;   error=sum(sum(abs(0.5*[D1(nor)-D7(del) D2(nor)-D8(del)])))
else
    if (jk<=100),
        [ARGD12(nor)' ARGD34(nor)' ARGD56(del)' ARG6(del)' ...
        ARG5(del)' ARGD78(del)' ARGD12(nor)'-ARGD78(del)' ...
        D1(nor)' D7(del)']
    end;   error=sum(sum(abs(0.5*[D1(nor)-D7(del)])))
end;
```

When the program is run it yields the following results:

```
ans =

3  3  3  3  0  3  0   1  -1   1  -1
  0  3  3  0  0  0  0   1   1   1  -1
  3  2  2  3  0  3  0   1  -1   1  -1
  0  2  2  0  0  0  0   1   1   1   1
  0  2  2  0  0  0  0   1   1   1   1
  2  0  0  2  0  2  0  -1  -1  -1  -1
  2  2  2  2  0  2  0  -1  -1  -1  -1
  2  0  0  2  0  2  0  -1  -1  -1  -1
  1  1  2  2  3  1  0  -1   1  -1   1
  0  1  2  0  0  0  0   1   1   1   1
  3  0  1  3  0  3  0   1  -1   1  -1
  0  0  1  0  0  0  0   1   1   1   1
  2  2  3  2  0  2  0  -1  -1  -1  -1
  1  3  0  1  0  1  0  -1   1  -1   1
  1  0  1  1  0  1  0  -1   1  -1   1
  1  1  2  1  0  1  0  -1   1  -1   1
  0  1  2  0  0  0  0   1   1   1   1
  1  2  3  1  0  1  0  -1   1  -1   1
  0  2  3  0  0  0  0   1   1   1   1
  3  1  2  3  0  3  0   1  -1   1  -1
  0  1  2  0  0  0  0   1   1   1   1
  1  2  3  1  0  1  0  -1   1  -1   1
  0  2  3  0  0  0  0   1   1   1   1
  3  1  3  0  3  3  0   1  -1   1  -1
  2  3  1  2  0  2  0  -1  -1  -1  -1
  3  2  0  3  0  3  0   1  -1   1  -1
  2  0  2  2  0  2  0  -1  -1  -1  -1
  0  0  2  0  0  0  0   1   1   1   1
  0  0  2  0  0  0  0   1   1   1   1 error =

0
```

1st to 7th column of the block "ans" correspond, in this sequence, to first and second phase number ARGD12, ARGD34, to the third, sixth, fifth and fourth phase numbers ARGD56, ARG6, ARG5, ARGD78 which each occur (NN−1)/2 symbols later, and to the difference between the third phase number ARGD56, and the fourth phase number ARGD78 occuring (NN−1)/2 symbols later. The 9th and 10th column, i.e. first and second binary symbol D1, D2, are identical with the 11th and 12th column, i.e. the seventh and eighth binary symbols D7, D8 occuring (NN−1)/2 symbols later. This is also documented by "error=0", which means that no bit error has occurred. In contrast, if one replaces the program line ARGD78(jj)=mod(ARG6(jj)+sum(ARG5(jj:−1:(jj−(K−1)))),N);

against

ARGD78(jj)=ARG6(jj);

which means that the most important inventive step is left out then errors occur, which manifest themselves in a program response in which "error" has a value greater than 0, and 9th and 10th column are not always identical with 11th and 12th column.

For the delay index K any other positive integer can replace the value K=1 stated in the above program.

Instead of a phase step number N=4, corresponding to quaternary or quadrature phase shift keying a binary phase shift keying can be chosen in the program by stating a phase step number N=2 in the program. In this case the following changes hold compared to the case N=4: Second, fourth, sixth and eighth binary signal D2, D4, D6, D8 must be set to zero in all equations and statements and also need not be calculated.

Instead of Table 1, Table 2 is now obtained. First to fourth data signal D12=D1, D34=D3, D56=D5, D78=D7 are therefore real.

The first to fourth phase number ARGD12, ARGD34, ARGD56, ARGD78 correspond to the sign of the first to fourth data signal D12, D34, D56, D78, respectively, with the value 0 for the positiv sign and the value 1 for the negative sign.

TABLE 2

| D1, D3, D5, D7 | ARGD12, ARGD34, ARGD56, ARGD78 |
|---|---|
| 1 | 0 |
| −1 | 1 |

Moreover, for N=2 only one frequency doubling is necessary, not two. Since (±1) taken to the second power equals 1, the frequency-multiplied signal FM12 is made, with a positive proportionality factor, proportional to the square of the received signal R12, by setting real part FM1 and imaginary part FM2 of the frequency-multiplied signal FM12 equal to real part R3 and imaginary part R4, respectively, of the frequency-doubled signal. The carrier phase angle angC12 now lies, due to N=2, between −π/2 and π/2. If at a phase step number N=2 the difference angC12−angC12*old* between current carrier phase angle angC12 and the carrier phase angle angC12*old* lying back by one symbol duration T lies in the interval [−π/2, π/2[ or [π/4, 3π/4[, then the fifth phase number ARG5 is being assigned the value 0 or 1, respectively, corresponding to phase jumps PHJ of size 0 and π, respectively. If in the program the statement "N=4;" is replaced by "N=2;" one obtains the following results when running the program:

```
ans =

0  0  0  0  0  0  0   1   1
  1  1  1  1  0  1  0  -1  -1
  1  0  0  1  0  1  0  -1  -1
  1  1  1  1  0  1  0  -1  -1
  0  1  1  0  0  0  0   1   1
  1  0  0  1  0  1  0  -1  -1
  1  1  1  1  0  1  0  -1  -1
  1  0  0  1  0  1  0  -1  -1
  1  1  1  1  0  1  0  -1  -1
  0  1  1  0  0  0  0   1   1
  1  0  0  1  0  1  0  -1  -1
  0  0  0  0  0  0  0   1   1
  0  0  0  0  0  0  0   1   1
  0  0  0  0  0  0  0   1   1
  0  0  1  1  1  0  0   1   1
  1  0  1  1  0  1  0  -1  -1
  0  1  0  0  0  0  0   1   1
  1  0  1  1  0  1  0  -1  -1
  0  1  0  0  0  0  0   1   1
  1  0  1  1  0  1  0  -1  -1
  0  1  0  0  0  0  0   1   1
  1  0  1  1  0  1  0  -1  -1
  0  0  1  0  0  0  0   1   1
  0  0  1  0  0  0  0   1   1
  0  0  1  0  0  0  0   1   1
  0  0  1  0  0  0  0   1   1
  1  1  0  1  0  1  0  -1  -1 error =

0
```

Their interpretation takes place as described above for N=4, with the following exception: The 9th column, i.e. the first binary symbol D1, is identical with the 10th column, i.e. the seventh binary symbol occurring (NN−1)/2 symbols later.

Instead of the programmed statement "method=1" one may also use "method=2", with identical results. In this second embodiment of the invention the phase angle of the complex received signal R12, called received signal phase angle ang, is determined immediately. The frequency multiplication is therefor particularly easy, it takes place by a multiplication of the received signal phase angle ang by the factor N. The result of this multiplication ist a multiplied phase angle angFM12. The frequency-multiplied signal FM12 is chosen proportional to the phasor exp(j*angFM12); with negative proportionality factor for N=4 and with positive proportionality factor for N=2. In the program this is conducted separately for the real part FM1 and the imaginary part FM2 of the frequency-multiplied signal FM12. Subsequently the carrier phase angle angC12 is calculated as described above. The same information content as real part FM1 and imaginary part FM2 of the frequency-multiplied signal FM12 is contained in two or more arbitrary, non-collinear linear combinations LC1, LC2, ... of real part FM1 and imaginary part FM2 of the frequency-multiplied signal FM12; even real part FM1 and imaginary part FM2 of the frequency-multiplied signal FM12 are such non-collinear linear combinations LC1, LC2.

Received signal R12, received signal real part R1, received signal imaginary part R2 and received signal phase angle ang each are a received signal parameter R12, R1, R2, ang.

For the synchronous demodulation of the received signal R12 the carrier phase angle angC12 is now subtracted from the received signal phase angle ang that has been delayed by (NN−1)/2 Symbol durations T. For a phase step number N=4 it holds: If this subtraction result lies modulo $2\pi$ in the interval $[0, \pi/2[$, $[\pi/2, \pi[$, $[\pi, 3\pi/2[$ or $[3\pi/2, 2\pi[$, then the third phase number ARGD56 is being assigned the value 0, 1, 2 or 3, respectively. For a phase step number N=2 it holds: If this subtraction result lies modulo $2\pi$ in the interval $[-\pi/2, \pi/2[$ or $[\pi/2, 3\pi/2[$, then the third phase number ARGD56 is being assigned the value 0 or 1, respectively.

For a phase step number N=4 it holds: If the difference between the current carrier phase angle angC12 and that carrier phase angle angC12old which is delayed by one symbol duration T lies in the interval $[-\pi/4, \pi/4[$, $[\pi/4, 3\pi/4[$, $[3\pi/4, 5\pi/4[$ or $[5\pi/4, 7\pi/4[$, then the fifth phase number ARG5 is being assigned the value 0, 1, 2 or 3, respectively. For a phase step number N=2 it holds: If this difference lies in the interval $[-\pi/2, \pi/2[$ or $[\pi/2, 3\pi/2[$, then the fifth phase number ARG5 is being assigned the value 0 or 1, respectively.

The carrier signal C12, its real part C1, its imaginary part C2 and the carrier phase angle angC12 each are a carrier signal parameter C12, C1, C2, angC12.

The parts of the inventive method that can be selected by "method=1" bzw. "method=2" are equivalent in their results. For "method=1" real and imaginary parts of complex variables are being processed, whereas for "method=2" the phase angles of complex variables are more in the center of.

The inventive methods are parallelizable, i.e., the received signal R12 or the received signal real part R1 and the received signal imaginary part R2 or the received signal phase angle ang can be processed in the signal processing unit SPU of FIG. 1 at a time division multiplex layer that is lower than the highest one, for example at the 1/M-fold of the symbol rate 1/T, where T is the symbol duration and the demultiplex factor M can for example be 4, 16 or 64. This demultiplex is performed according to FIG. 1 in an 1:M demultiplexer DEMUX. This demultiplex is usually advisable, but is not mandatory. In the lower time division multiplex layer all signals appear cyclically, at the outputs of the 1:M demultiplexer DEMUX and in there-connected first to M-th sub-units DUi mit i=1, 2, 3, ..., M. Here the index i of the i-th sub-unit DUi cycles in the sequence in which they are procured with demultiplexed signals from the 1:M demultiplexer DEMUX through the values 1, 2, 3, ..., M, 1, 2, 3, ..., M, 1, 2, 3, ..., M, 1, 2, 3, .... The symbol duration in the lower time division multiplex layer is M*T. After appearance of a signal its cyclical successor appears after the elapsing of a symbol duration T. The demultiplexed signals are processed in the M different but identically constructed first to M-th sub-units DUi with i=1, 2, 3, ..., M. At their outputs they each deliver seventh and, for N=4, eighth binary symbols D7, D8 in demultiplexed form, or simply the fourth phase number ARGD78 in demultiplexed form. For a clear representation the output signals of first to M-th sub-unit DUi are merged to bus signals. In this form seventh and, for N=4, eighth binary symbols D7, D8 or the fourth phase number ARGD78 form the output signals of the signal processing unit SPU. For simplicity let by a k-th sub-unit DUk that has an index k which lies not in the range 1, 2, 3, ..., M be meant that (k+g*M)-th sub-unit DU(k+g*M), of which the index k+g*M lies in the range 1, 2, 3, ..., M. This is always possible by choosing a suitable integer g.

Figure 3:
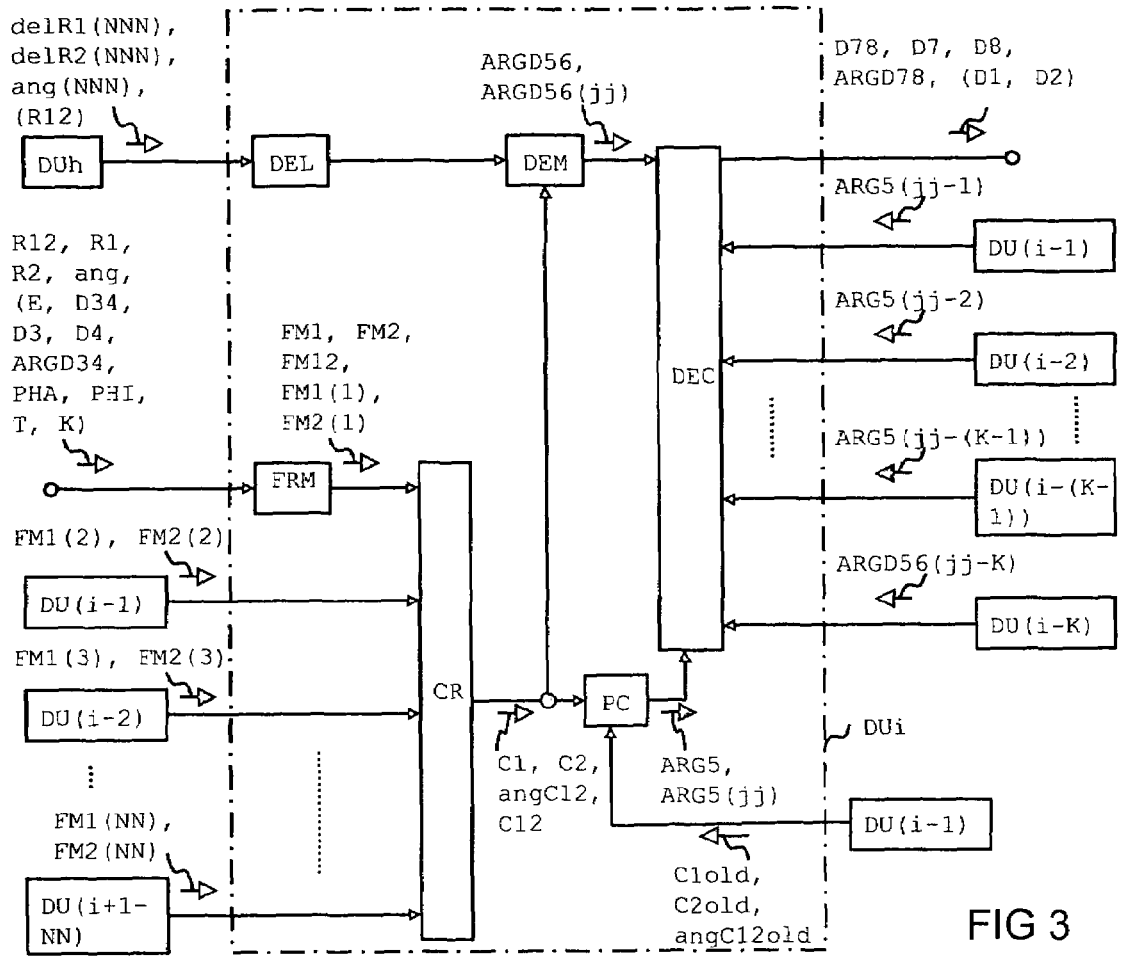
FIG. 3 is a sub-unit.

The structure of the i-th sub-unit DUi is shown in FIG. 3. For the synchronous demodulationat least one of the delayed received signal variables delR1(NNN), delR2(NNN) or ang (NNN) is needed there. These are received signal real part R1 and received signal imaginary part R2, or received signal phase angle ang, but each delayed by (NN−1)/2 symbol durations T.

The adaptation index NNN equals (NN+1)/2 and is therefore, as required, larger by (NN−1)/2 than the not-delayed index 1. The delayed received signal variabls delR1(NNN), delR2(NNN), ang(NNN) are made available by and are taken from the (i−(NN−1)/2)-th sub-unit DU(i−(NN−1)/2). Accordingly, the (i−(NN−1)/2)-th sub-unit DU(i−(NN−1)/2) is active by (NN−1)/2 steps or symbol durations T earlier than the i-th sub-unit DUi. Therefore a first storage unit DEL is provided in the i-th sub-unit DUi. It stores the delayed received signal variables delR1(NNN), delR2(NNN), ang (NNN) until they are needed for the synchronous demodulation. If (NN−1)/2 equals an integer multiple of the demultiplex factor M, then the (i−(NN−1)/2)-th sub-unit DU(i−(NN−1)/2) is identical with the i-th sub-unit DUi. This means that the delayed received signal variables delR1 (NNN), delR2(NNN), ang(NNN) occur locally in the i-th sub-unit DUi and can be stored thereat in the first storage unit DEL.

Real part FM1 and imaginary part FM2 of the frequency-multiplied signal FM are generated inside the i-th sub-unit DUi in a frequency multiplication unit FRM from the received signal R12, or more precisely from received signal real part R1 and received signal imaginary part R2 or from the received signal phase angle ang as described above. The subsequent lowpass filtering and the final recovery of the carrier C12 in form of its real part C1 and its imaginary part C2, or of the carrier phase angle angC12, occurs in a carrier recovery unit CR inside the i-th sub-unit DUi. For lowpass filtering inside the carrier recovery unit CR, NN samples of both real part FM1 and imaginary part FM2 of the frequency-multiplied signal FM are needed, which are temporally delayed by 0 to (NN−1) steps with respect to that real part FM1 and imaginary part FM2 of the frequency-multiplied signal FM that occur in the i-th sub-unit DUi. These carry the indexes k=1, 2, . . . , NN and are called k-th frequency multiplier output signals FM1(k), FM2(k) bezeichnet. The k-th frequency multiplier output signals FM1(k), FM2(k) are made available by and are taken from the frequency multiplier unit FRM of the (i+1−k)-th sub-unit DU(i+1−k) and are, if necessary, stored and processed in the carrier recovery unit CR of the i-th sub-unit DUi, whereby the lowpass-filtered signal L12 and finally the carrier signal C12 are generated. A phase angle comparator PC calculates the fifth phase number ARG5 from the carrier signal C12 in form of its real parts C1 and imaginary part C2, or of its carrier phase angle angC12. In doing so, that carrier signal which is delayed by one symbol duration T, in form of its real part C1old and imaginary part C2old, or of its phase angle angC12old, is also being used and is therefore made available by the carrier recovery unit CR of the (i−1)-th sub-unit DU(i−1), and is, if necessary, delayed or temporarily stored in the phase angle comparator PC of the i-th sub-unit DUi. The phase angle comparator PC therefore also acts as a third storage unit PC.

A demodulation unit DEM obtains the third phase number ARGD56 from the carrier signal C12 in form of its real part C1 and its imaginary part C2, or of the carrier phase angle angC12, and from the delayed received signal variables delR1(NNN), delR2(NNN) or ang(NNN).

Finally the fourth phase number ARGD78, and from it the fourth data signal D78 and the seventh and eighth binary symbols D7, D8, are obtained by modulo-N addition from the third phase number ARGD56, which is called ARGD56(jj) in the program, from the negative of that third phase number ARGD56 that is delayed by K symbol durations T, which is called ARGD56(jj−K) in the program and which is provided by the demodulation unit DEM of the (i−K)-th sub-unit DU(i−K) and is, if necessary, delayed and temporarily stored in the second coding unit DEC of the i-th sub-unit DUi, and from those fifth phase numbers ARG5 that are delayed by 0 to (K−1) symbol durations T, which are called ARG5(jj) bis ARG5(jj−(K−1)) in the program, and among which those which are delayed by 1 to (K−1) symbol durations T are each provided by the carrier recovery unit CR of the (i−1)-th to (i−(K−1))-th sub-unit DU(i−1) to DU(i−(K−1)) and are, if necessary, delayed or stored in the second coding unit DEC of the i-th sub-unit DUi. The second coding unit DEC therefore also serves as a second storage unit DEC. Fourth phase number ARGD78, fourth data signal D78 and seventh and eighth binary symbols D7, D8 each are a fourth data signal parameter D78, D7, D8, ARGD78.

In another embodiment of the invention, which is particularly suited for phase step numbers of N=4 or higher but which also can be employed for a phase step number of N=2, the processing of the received signals R12 takes place in a simplified form. While usually the received signal real part R1 and the received signal imaginary part R2 are digitized independently and serve, while traversing the 1:M demultiplexer DEMUX, for the determination of the respective received signal phase angle ang one can as well digitize the received signal phase angle ang directly. For this purpose one employs in the coherent optical receiver OE or in the 1:M demultiplexer DEMUX a first to V-th comparator COb with b=1, 2, . . . , V, which determines a first to V-th comparator output signal SCOb=sgn(−R1*sin(2πb/V)+R2*cos(2π/V)), where sgn is the signum or sign function. For this purpose first to V-th linear combinations −R1*sin(2πb/V)+R2*cos(2πb/V) of received signal real part R1 and received signal imaginary part R2 must be formed. If it holds R1=R*cos(ang), R2=R*sin(ang), where R is a non-negative received signal amplitude R, then it holds SCOb=sgn(sin(ang−2πb/V)). Therefore it holds SCO(w+V/2)=−−SCOw with w=1, 2, . . . , V/2. This means that one can do without the (V/2+1)-th to V-th comparator CO(V/2+1) to COV if one simply takes the negative of the first to V/2-th comparator output signal as the (V/2+1)-th to V-th comparator output signal.

Just as the comparators in normal parallel analog-to-digital converters generate a thermometer code the first to V-th comparator output signals SCO1 to SCOV correspond to a cyklical thermometer code. It can be transformed into a digital signal which represents the received signal phasen angle ang in digitized form.

With minor adaptations the invention can also be used for other carrier recovery, for example for a carrier recovery with a phase-locked loop as described by Frowin Derr, Coherent optical QPSK intradyne system: Concept und digital receiver realization, *IEEE J. Lightwave Technology* Vol. 10, 1290-1296, (1992).

With minor adaptations the invention can also be used for other phase step numbers N than 2 or 4, for example N=8 or N=16. Likewise it can be adapted for related signal formats such as 16-ary or 32-ary quadrature amplitude modulation (16-QAM, 32-QAM).

This application claims the priority, under 35 U.S.C. § 119, of German patent application No. 103 34 154.4, filed Jul. 26, 2003; the entire disclosure of the prior application is herewith incorporated by reference.

I claim:

1. An apparatus for a synchronous demodulation of a received signal that is phase shift keyed in N steps, where N is a phase step number, with the aid of at least one received signal parameter derived from the received signal and at least one carrier signal parameter corresponding to a recovered carrier, comprising:

a demodulator for generating at least one third data signal parameter from at least one received signal parameter and at least one carrier signal parameter by way of synchronous demodulation and digitization, the third data signal parameter corresponding to a third data signal;

a phase angle comparator connected to said demodulator, said phase angle comparator detecting phase jumps of the recovered carrier signal in quantized form from at least one carrier signal parameter; and a coding unit connected to said demodulator and to said phase angle comparator, said coding unit taking into account in quantized form the phase jumps in a differential decoding of the third data signal parameter.

2. The apparatus according to claim 1, wherein:

said phase angle comparator is configured to generate a fifth phase number as an integer number, the fifth phase number corresponding to a phase jump of the recovered carrier signal, the phase jump being equal to the value of the fifth phase number times 2π/N;

a third phase number representing the third data signal parameter; and said coding unit is configured to generate a fourth phase number from a current third phase number, from the third phase number delayed by K symbol durations, wherein K is a delay index, and from the fifth phase numbers delayed by 0 to (K−1) symbol durations.

3. The apparatus according to claim 2, which further comprises a transmitter side, and a first coding unit at the transmitter side, said first coding unit generating a second phase number which corresponds to a second data signal by modulo-N addition of a first phase number which corresponds to a first data signal intended for transmission and the negative of said second phase number delayed by K symbol durations; and said received signal which in complex notation is formed proportional to a received complex carrier times said second data signal, so that said fourth phase number corresponds to said first phase number delayed by the delay that occurs during transmission.

4. The apparatus according to claim 1, which further comprises:

a 1:M demultiplexer for receiving at least one received signal parameter and having M outputs; and first to M-th sub-units, each connected to a respective one of the M outputs of said 1:M demultiplexer, said sub-units providing at least one fourth signal parameter in demultiplexed form.

5. The apparatus according to claim 4, which further comprises:

at least one storage unit in an i-th of said sub-units, said storage unit storing at least one signal that is generated by at least one of said 1:M demultiplexers and i-th and other of said sub-units until the signal is needed for further processing.

6. A method for a synchronous demodulation of a received signal that is phase shift keyed in N steps, where N is a phase step number, with the aid of at least one received signal parameter derived from the received signal and at least one carrier signal parameter corresponding to a recovered carrier, the method which comprises:

generating at least one third data signal parameter from at least one received signal parameter and at least one carrier signal parameter by synchronous demodulation and digitization, the third data signal parameter corresponding to a third data signal;

detecting phase jumps of the recovered carrier signal in quantized form from at least one carrier signal parameter; and taking into account in quantized form the phase jumps in a differential decoding of the third data signal parameter.

7. The method according to claim 6, which comprises:

generating a fifth phase number formed as an integer, the fifth phase number corresponding to a phase jump of the recovered carrier signal, the phase jump being equal to a value of the fifth phase number times $2\pi/N$;

forming the third data signal parameter as a third phase number; and generating a fourth phase number from a current third phase number, from the third phase number delayed by K symbol durations, wherein K is a delay index, and from the fifth phase numbers delayed by 0 to (K−1) symbol durations.

8. The method according to claim 7, which comprises:

generating a second phase number corresponding to a second data signal by modulo-N addition of a first phase number corresponding to a first data signal intended for transmission and a negative of the second phase number delayed by K symbol durations; and forming the received signal in complex notation to be proportional to a received complex carrier times the second data signal, so that the fourth phase number corresponds to the first phase number delayed by a delay occurring during transmission.

9. The method according to claim 6, which comprises:

temporally demultiplexing at least one received signal parameter with a 1:M demultiplexer to form a demultiplexed received signal parameter; and generating at least one fourth signal parameter in demultiplexed form from the demultiplexed received signal parameter.

10. The method according to claim 9, which comprises:

subsequent to a completion of the demultiplexing step, storing at least one signal until the signal is needed for further processing.

* * * * *